Aug. 7, 1923.

S. B. COLLIER 1,464,408

ROTARY INTERNAL COMBUSTION ENGINE

Filed March 1, 1922 4 Sheets-Sheet 1

WITNESSES
W. A. Williams.

INVENTOR
S. B. Collier
BY
Munn & Co.
ATTORNEYS

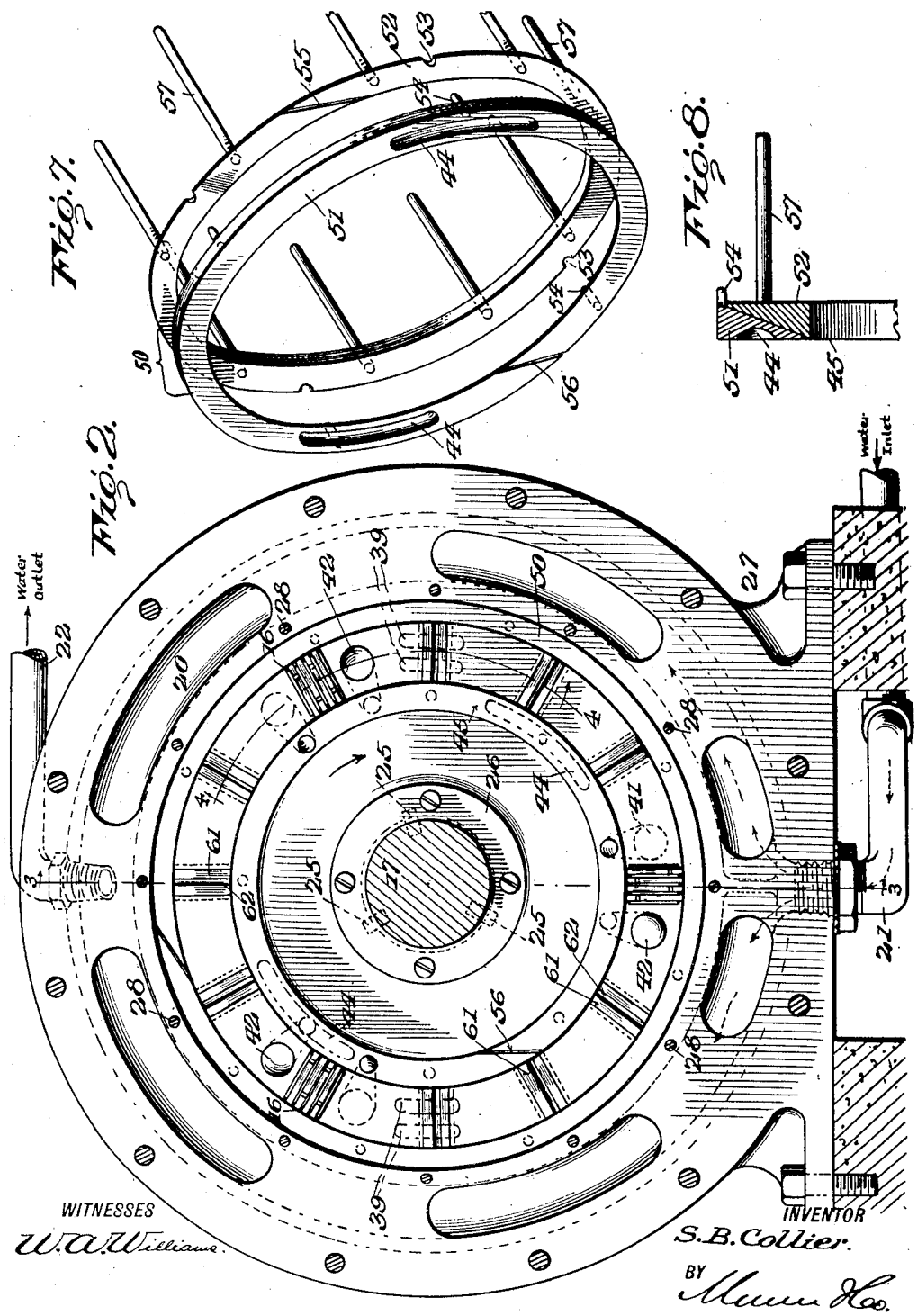

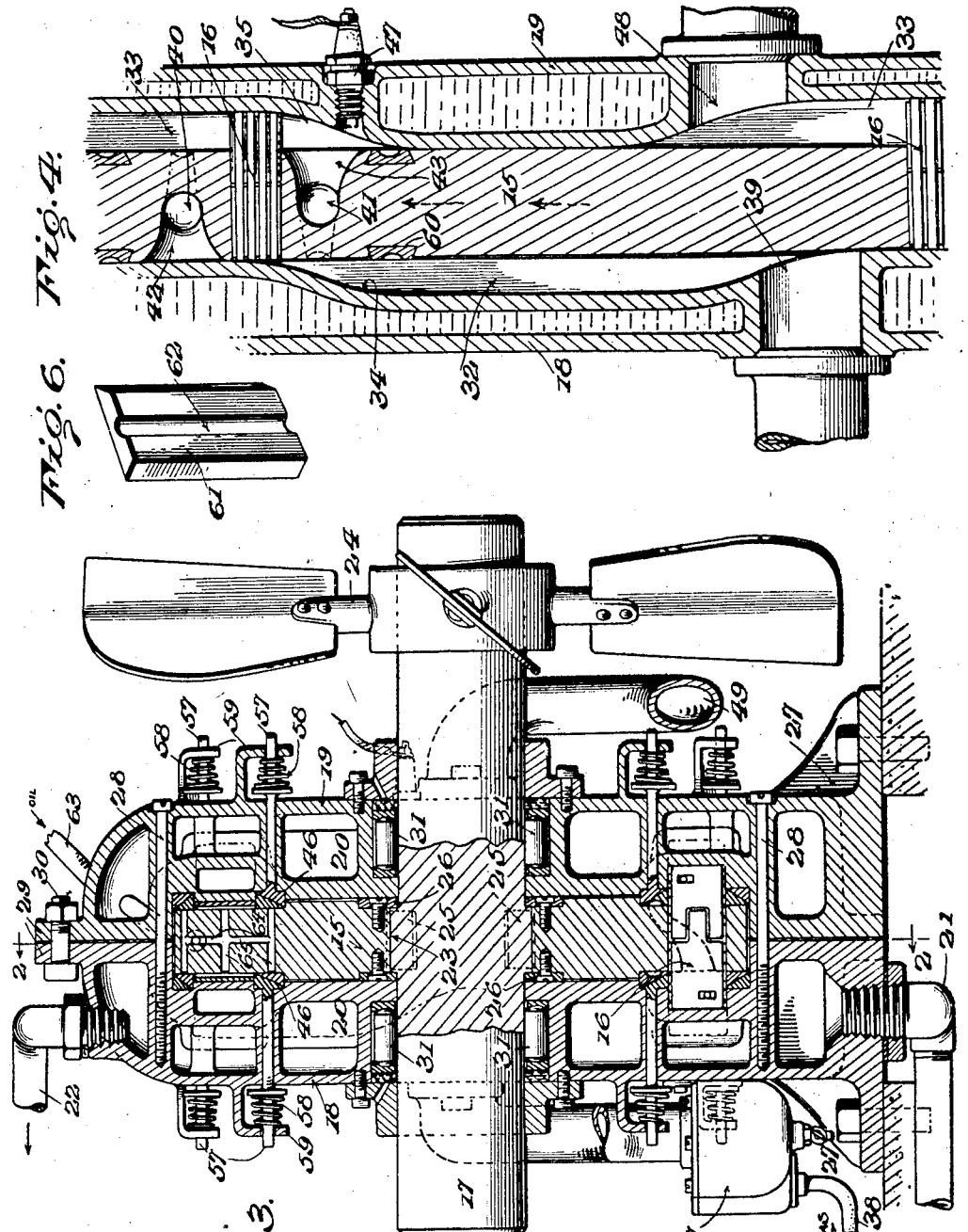

Aug. 7, 1923.  1,464,408
S. B. COLLIER
ROTARY INTERNAL COMBUSTION ENGINE
Filed March 1, 1922   4 Sheets-Sheet 4
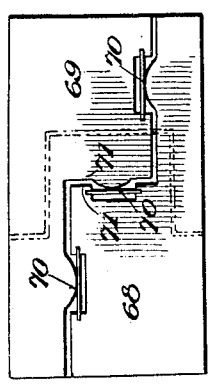
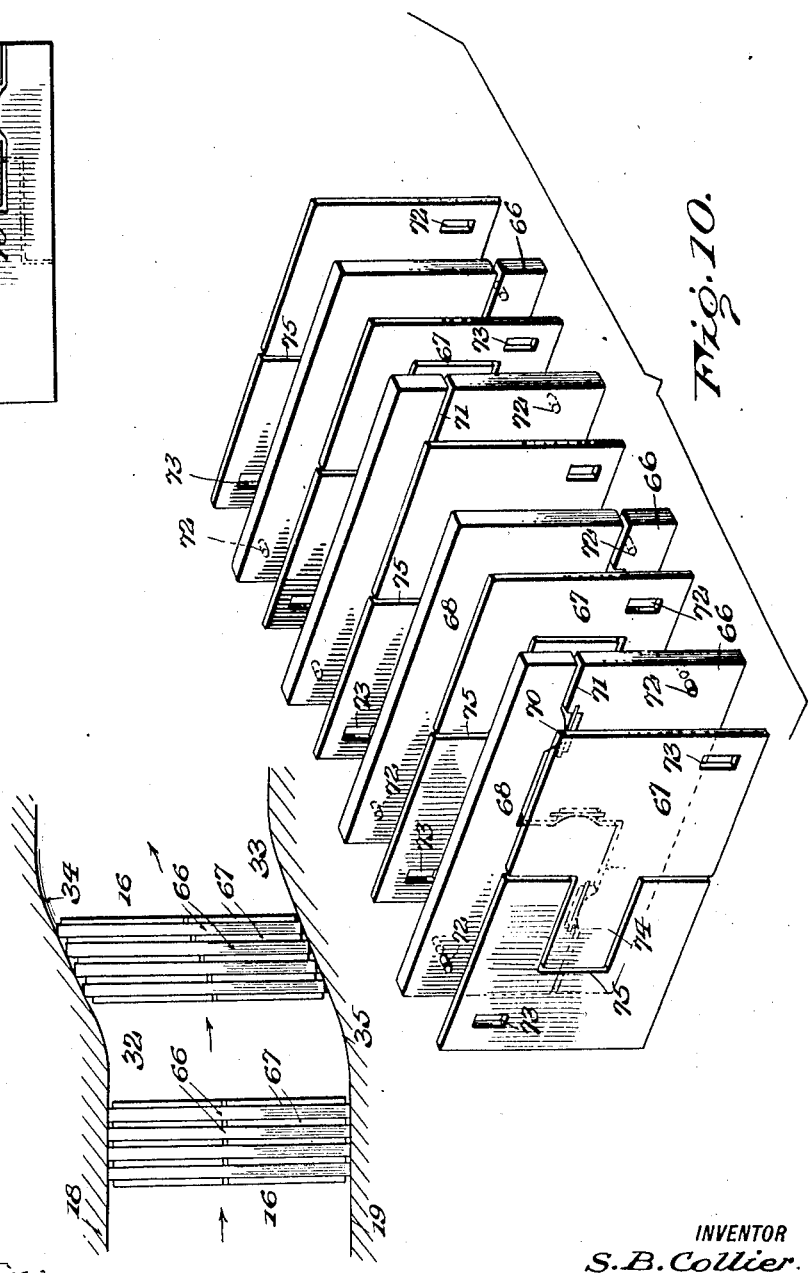
WITNESSES
W. A. Williams.
INVENTOR
S. B. Collier.
BY
ATTORNEYS Patented Aug. 7, 1923.

1,464,408

UNITED STATES PATENT OFFICE.

SHADE B. COLLIER, OF ORLANDO, FLORIDA.

ROTARY INTERNAL-COMBUSTION ENGINE.

Application filed March 1, 1922. Serial No. 540,119.

*To all whom it may concern:*

Be it known that I, SHADE B. COLLIER, a citizen of the United States, and a resident of Orlando, in the county of Orange and State of Florida, have invented certain new and useful Improvements in Rotary Internal-Combustion Engines, of which the following is a specification.

My present invention relates to internal combustion engines and more particularly to internal combustion engines of the rotary type, my primary object being the provision of an internal combustion engine which will be efficient, economical and practically without vibration in operation.

A further object is the provision of an internal combustion engine of the rotary type which will be highly effective and efficient in use by virtue of the construction, relative disposition and operation of certain of the parts precluding leakage and thus maintaining uniformly high compression at all times without the disadvantages growing out of the collection of carbon, as exist in internal combustion engines of the reciprocating type.

Other and further objects together with the resulting advantages of my invention, will more clearly appear in the course of the following description, reference being had to the accompanying drawings, which show various parts and which form a part of this specification.

In the drawings,

Figure 2 is a central vertical transverse section taken on line 2—2 of Figure 3, Figure 3 is a vertical longitudinal section taken centrally through the engine on line 3—3 of Figure 2.

Figure 5:
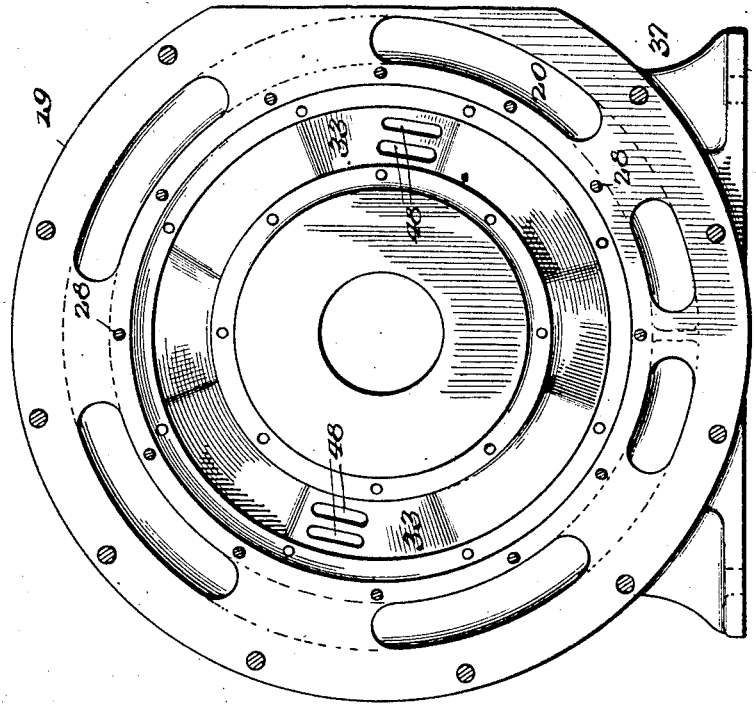

Figure 4 is an enlarged fragmentary section taken circumferentially through the engine on line 4—4 of Figure 2, Figure 5 is an inner face view of one section of the casing, Figure 6 is a detail perspective view of one of the radial packing strips of the rotor, Figure 7 is a perspective view of one of the circumferential packing rings, Figure 8 is an enlarged detail section through a portion of the rings of Figure 7, Figure 9 is a diagrammatic view illustrating the manner of shifting of each piston, Figure 10 is a detail perspective view of one of the composite pistons, the parts being shown in detached relation, and Figure 11 is a face view of one of the piston blades.

Referring now to these figures my invention proposes a rotary internal combustion engine of that type in which a rotor 15 having laterally slidable pistons 16 at three equidistantly spaced points therearound, is mounted upon a power shaft 17 between the side sections 18 and 19 of the stator, each of which side sections is hollow to provide water spaces 20 for the circulation of cooling fluid through the stator from a lower water intake connection 21 to an upper water outlet connection 22 completing a circulation through any suitable cooling apparatus as for instance an automobile radiator and the like.

The rotor 15 is secured upon an annularly shouldered portion 23 of the power shaft 17, the latter of which while useful for various purposes, is shown in Figure 3 as provided upon an exposed portion with a fan 24 it is desired to drive. This annularly shouldered portion 23 is grooved so as to form, with similar grooves 25 of the rotor, a series of slots for the reception of connecting keys, the latter of which are held firmly in place by side clamping rings 26 secured to the rotor within annular grooves of the latter around the power shaft at opposite sides of its shoulder 23.

The side sections 18 and 19 of the stator, which have lower supporting flanges or foot portions 27, and of which side section 18 is the intake section and side section 19 is the exhaust section, are connected by transverse clamping bolts 28, the latter of which pass between these side sections beyond the periphery of the rotor and through inwardly offset outer portions of the stator which abut one another in the median plane of the rotor and have bolted flanges 29, the connecting bolts appearing at 30 through these flanges.

The inner portions of the side sections 18 and 19 of the stator also support roller bearings 31 around the power shaft 17 in order to reduce friction in operation and avoid wear of the shaft due to any angular strains which might be imposed thereon by virtue of side thrust of the rotor.

In the circular plane of movement of the several laterally shiftable pistons 16 of the rotor, the inner faces of the side sections 18 and 19 of the stator have recessed chambers at diametrically opposed points, the intake and compression chambers 32 of section 18 alternating with the explosion and exhaust chambers 33 of the section 19 as will be clearly seen by a comparison of Figures 4 and 5. These chambers in their alternating relation and with sloping end portions or shoulders 34 and 35, form a tortuous passage for the pistons 16 causing the latter to shift laterally between and into the chambers during movement of the rotor.

Figure 1:
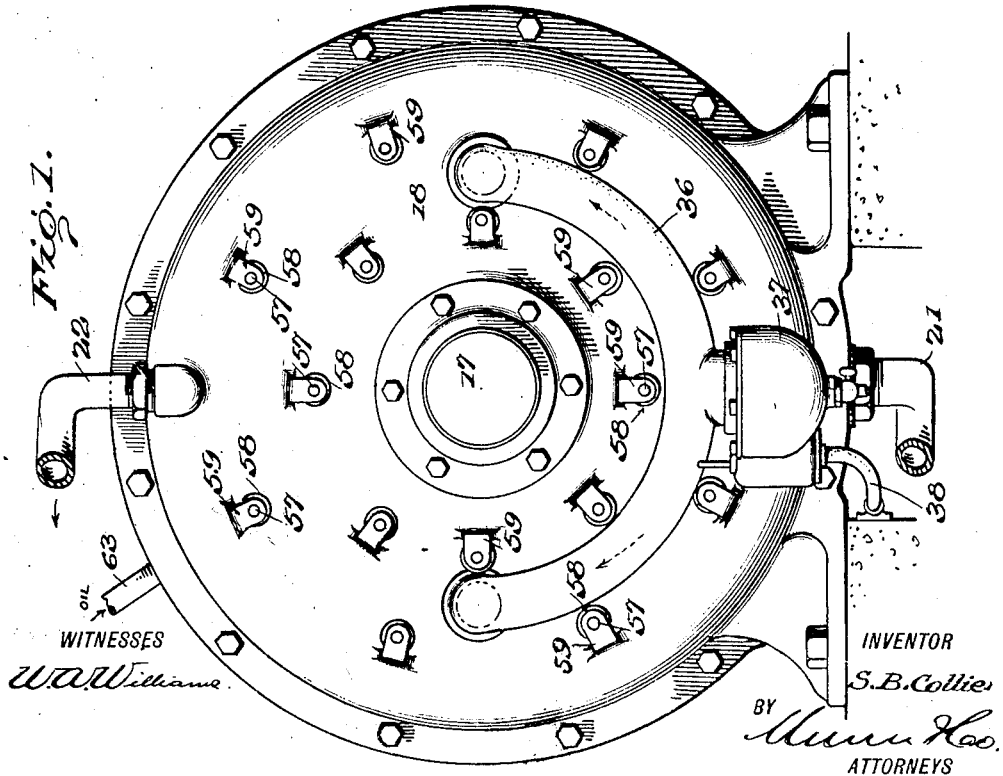
Figure 1 is a side elevation of the engine proposed by my invention.

In order that the desired power movements of the rotor may take place, each intake and compression chamber 32 is in communication at its respective side of the rotor with one branch of the intake manifold 36, the latter shown particularly in Figure 1 as leading from a carbureter 37 having a gas supply line 38. This combustible fuel intake of each intake and compression chamber is shown at 39 in Figure 4 and is located as will be noted from this figure at the forward end of the chamber with respect to the direction of movement of the rotor so that as each piston 16 proceeds into each intake chamber it will compress the charge of fuel at that time within the chamber, between the piston and the rear end of the chamber. This compressed charge is then transferred through the rotor to the forward end of the next explosion chamber 33 upon the relatively opposite side of the rotor, by virtue of angular channels 40 and 41, respectively at the front and rear of each piston 16, channel 40 having a flaring mouth 42 at its outer end opening laterally through the rotor toward the stator section 18 and channel 41 having a flaring mouth 43 at its outer end opening laterally through the rotor toward the stator section 19. These channels 40 and 41 are placed in communication with one another as the charge is compressed in each intake and compression chamber 32 and continue in communication until the rotor has preceded to a point where the flaring mouth 43 opens into the next succeeding explosion chamber 33 by virtue of diametrically opposed arcuate grooves 44 in the inner faces of the inner annular rings 45 seated in annular grooves 46 around the inner surfaces of the stator sections and disposed to engage the rotor around the inner portion of its outer reduced piston supporting portion. These rings are stationary with the stator sections as will be hereinafter described and thus the grooves 44 stand at all times ready to establish communication between the inner ends of the angular channels 40 and 41 of the rotor in order to properly transfer the formed charges from the intake to the explosive side of the rotor, each explosion chamber 33 being in communication at its forward end with respect to the direction of movement of the rotor with a spark plug 47 fired at the proper time in order to explode the charge of gas transferred through the rotor from in front of each piston to the rear of each piston, after the respective charge transferring groove 44 of the inner ring 45 has been passed and communication between the angular channels 40 and 41 has thus been broken.

Each explosion chamber 33 is moreover in communication at its rear end through an exhaust port 48 with one branch of an exhaust manifold 49 so that following each explosive stroke and the succeeding movement of the rotor during which the piston is shifted into the next opposite intake chamber, the explosion chamber is thus in open communication with the exhaust and is in fact thoroughly scavenged by virtue of the passage of the next successive piston thereinto.

From the foregoing description and by reference to the several figures and Figure 2 in particular it will be noted that while there are two points of intake, diametrically opposed and two points of exhaust also diametrically opposed, the rotor is provided with three pistons at equi-distantly spaced points therearound, each piston proceeding through the operations previously described so that there will be no two explosions at the same time and a continuous torque of movement is brought about.

In addition to the inner ring 45 previously mentioned, outer rings 50 are provided and are seated in the inner surfaces of the sections 18 and 19 of the stator to engage that portion of the rotor outwardly beyond the pistons 16, both the inner rings 45 and the outer ring 50 being in two parts 51 and 52 having parallel outer side surfaces and having inner abutting beveled surfaces, section 52 having at spaced points therearound recesses 53 receiving laterally projecting pins 54 of the section 51 so that the sections are prevented from relative rotation. The sections 52 of the several rings have split beveled ends 55, like the split beveled ends 56 of the sections 51, and sections 52 are also provided with laterally projecting pins 57 extending through the side sections 18 and 19 and outwardly beyond the side surfaces of these sections for the reception of springs 58, these outer ends of the pins 57 being mounted through external side brackets 59 of the stator sections, against which brackets the said springs 58 bear in order to yieldingly press the pins 57 inwardly at all times and thus yieldingly press the rings 45 and 50 against the rotor 15 inwardly of and outwardly beyond its piston 16 and at the same time spread the sections 51 and 52 of the rings by virtue of the relatively engaging inner beveled surfaces of the rings as plainly seen in Figures 3, 7 and 8.

The rotor 15 is also provided between its equidistantly spaced pistons 16 with radial grooves 60, having undercut side walls and receiving radially disposed pressure members 61, one of which is shown in detail in Figure 6, having lengthwise grooves 62, these pressure members extending between the inner packing ring 45 and the outer packing ring 50 and being adapted to press outwardly against the inner surfaces of the stator sections 18 and 19 between the chambers thereof at opposite sides of the rotor in order to further avoid leakage, outward pressure of these pressure members 61 being preferably brought about by the introduction of lubricating oil under suitable pressure through an oil supply pipe 63 which extends inwardly through the peripheral portion of the stator and opens into its annular cavity against the periphery of the rotor, the latter of which is preferably provided with radial oil channels 64 in communication with the transverse oil passages 65. These oil passages 65 it will be noted from Figure 3 open through the sides of the rotor 15 against the inner and outer rings 45 and 50 and also against the pressure members 61.

In order that the several pistons may move easily through the tortuous pathway in the travel of the rotor and at the same time minimize leakage past the same, each piston is formed of a series of piston plates 66 with relatively thin spacing plates 67 between and upon opposite sides of the piston plates. Each piston plate, one of which is shown in Figure 11, is in two L-shaped sections 68 and 69 with springs 70 disposed therebetween at spaced points therealong including the inner offset or shouldered portions 71 so that the several piston plates are thus expansible in all directions, each piston plate being also provided at diagonally opposite corners with laterally outstanding pins 72 which loosely enter apertures 73 in the adjacent sectional spacing plates 67, the sections of the latter of which have interengaging tongues 74 and recesses 75 so that by alternately reversing the several plates it becomes quite obvious that leakage through the piston is prevented and the piston is at the same time able to yield easily, without friction, and with minimum leakage past its sides, along the angular or curved portions of the piston channel at the ends of the intake and explosion compartments in the manner shown by the diagram, Figure 9.

Thus it will be understood that in operation as each piston shifts laterally into one of the intake and compression chambers 32, the charge which has previously filled the chamber by virtue of its open communication with the adjacent intake port 39, is compressed in front of the piston and forced into the angular channel 40 in a highly compressed state through the intake mouth 42 of this channel so as to be ready for transfer through the rotor into the adjacent end of the next successive explosion chamber 33 and behind the piston when the latter shifts into the explosion chamber as in Figure 4, this transfer taking place as soon as communication is established between the inner ends of the channels 40 and 41 through the adjacent groove 44 of the ring 45. The charge is then fired and burns completely in the explosion chamber 33 until the piston shifts into the next succeeding intake chamber whereupon the exploded charge exhausts through the exhaust ports 48. This operation takes place continuously in the movement of the rotor as each of its pistons approach one of the intake chambers and in view of the fact that there are three pistons in the rotor and but two points of power application, diametrically opposed to one another, it is quite obvious power is derived from a continuous series of single explosions which make up a torque of movement as nearly uniform as is possible in the motor of a size adapted for automobiles, motor cycle and launch driving is concerned. It is also obvious that this proportion of parts may be carried out on a greater scale in larger motors.

It is furthermore obvious that by use of the particular rings and pressure members as well as the construction of the pistons, I am able to minimize leakage, maintain a uniformly high compression and in this way insure maximum power coupled with minimum wear and low cost of upkeep.

I claim:

1. In a rotary internal combustion engine, a plurality of pistons, a rotor in which the pistons are laterally slidable, having angular channels at opposite sides of said pistons whose inner ends open through the same side of the rotor inwardly beyond the pistons and whose outer ends open through relatively opposite sides of the rotor, a stator in which the rotor operates having fuel receiving and charge compressing recesses to receive one end of the pistons at one side of the rotor and having recesses to receive the opposite ends of the pistons at the opposite side of the rotor forming explosion chambers and alternating with the said intake recesses circumferentially of the rotor, igniting means in said explosion chambers, and means carried by the stator to control communication between the inner ends of the said angular channels of the rotor.

2. In a rotary internal combustion engine, a plurality of pistons, a rotor in which the pistons are laterally shiftable, having angular channels at opposite sides of said pistons whose inner ends open through the same side of the rotor inwardly beyond the pistons and whose outer ends open through relatively opposite sides of the rotor, a stator in which the rotor operates having fuel, receiving and charge compressing recesses for the pistons at one side of the rotor and having recesses for the pistons at opposite sides of the rotor forming explosion chambers and alternating with the said intake recesses, igniting means in said explosion chambers, and rings within the stator adjacent to the rotor and inwardly beyond the pistons, one of which rings has recesses controlling communication between the inner ends of the said angular channels of the rotor.

3. In a rotary internal combustion engine, a rotor having laterally shiftable pistons, a stator having a rotor compartment and having a tortuous annular passage for the pistons including intake and explosion chambers, and rings within and around the stator engaging the rotor at points adjacent to the inner and outer edges of the pistons.

4. In a rotary internal combustion engine, a rotor having laterally shiftable pistons, a stator having a rotor compartment and having a tortuous annular passage for the pistons including intake and explosion chambers, and rings within and around the stator engaging the rotor at points adjacent to the inner and outer edges of the pistons, each of said rings being in two split circular sections having laterally abutting beveled faces, and means to continuously apply pressure to one of said sections for expanding the other section.

5. In a rotary internal combustion engine, a rotor having laterally shiftable pistons, a stator having a rotor compartment and having a tortuous annular passage for the pistons including intake and explosion chambers, sealing rings within and around the stator engaging the rotor at points adjacent to the inner and outer edges of the pistons, each of said rings being in two split circular sections having laterally abutting beveled faces, and spring pressed stems extending from one of said sections and projecting exteriorly through the stator acting to hold the ring sections in close contact.

6. In a rotary internal combustion engine, a rotor having laterally shiftable pistons, a stator having a rotor compartment and having a tortuous annular passage for the pistons including intake and explosion chambers, sealing rings within and around the stator engaging the rotor at points adjacent to the inner and outer edges of the pistons, each of said rings being in two split circular sections having laterally abutting beveled faces, stems projecting from one of said sections exteriorly through the stator, brackets on the stator sides, and springs having bearing in said brackets and engaging the said projecting stems acting to hold the ring sections in close contact.

7. In a rotary internal combustion engine, a rotor having laterally shiftable pistons at circumferentially spaced points, a stator having a compartment in which the rotor moves and having a tortuous annular passage in the walls of said compartments to receive the pistons and including intake and explosion chambers, sealing rings around and within the said compartment of the stator engaging the rotor inwardly of and outwardly beyond the said pistons, and pressure members carried by the rotor and having limited lateral movement with respect thereto for movably engaging the stator between its said rings.

8. In a rotary internal combustion engine, a rotor having laterally shiftable pistons, a stator having a rotor compartment and having a tortuous annular passage for the pistons including intake and explosion chambers, and sealing rings within and around the stator engaging the rotor at points adjacent to the inner and outer edges of the pistons, said rotor having radial dovetail grooves at spaced points between its said pistons, and pressure plates having beveled sides movably disposed within said grooves to engage the stator between its said rings.

9. In an internal combustion engine, a rotor having laterally shiftable pistons, a stator having a compartment in which the rotor moves and having a tortuous passage around and within said compartment for the pistons, including intake and explosion chambers at opposite sides of the rotor and in alternating relation therearound, having sloping ends, each of said pistons including a series of juxtaposed piston plates in lengthwise and transversely yieldable sections, and spacing plates between and upon opposite sides of the series of piston plates, said spacing plates being movably connected to the piston plates and in relatively movable sections arranged to cover the joints between the sections of the piston plates.

10. In an internal combustion engine, a rotor having laterally slidable pistons and having charge transferring channels extending transversely therethrough from one side to the other and angularly from the front to the rear of each of the pistons, a stator having a rotor compartment and a tortuous annular passage for the pistons including transversely alined intake and explosion chambers at relatively opposite sides of the rotor in the former of which fuel is compressed and transferred through the said rotor channels to the explosion chambers, igniting means in the explosion chambers, and sealing rings for the rotor nonrotatably supported in connection with the stator having means for controlling the flow of fuel through said transfer channels of the rotor as described.

SHADE B. COLLIER.